(12) United States Patent
Hashida et al.

(10) Patent No.: US 10,005,685 B1
(45) Date of Patent: Jun. 26, 2018

(54) SCALE INHIBITOR, SCALE-INHIBITING DEVICE USING THE SAME, AND SCALE-INHIBITING SYSTEM

(71) Applicant: Panasonic Intellectual Property Management Co., Ltd., Osaka (JP)

(72) Inventors: Takashi Hashida, Shiga (JP); Muneto Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 20 days.

(21) Appl. No.: 15/324,509

(22) PCT Filed: Jul. 6, 2015

(86) PCT No.: PCT/JP2015/003386
§ 371 (c)(1),
(2) Date: Jan. 6, 2017

(87) PCT Pub. No.: WO2016/006225
PCT Pub. Date: Jan. 14, 2016

(30) Foreign Application Priority Data

Jul. 10, 2014 (JP) .................. 2014-142324

(51) Int. Cl.
| | |
|---|---|
| C02F 5/08 | (2006.01) |
| B01J 20/04 | (2006.01) |
| B01J 20/28 | (2006.01) |
| A47J 31/60 | (2006.01) |

(52) U.S. Cl.
CPC ............. *C02F 5/086* (2013.01); *B01J 20/048* (2013.01); *B01J 20/28004* (2013.01); *B01J 20/28016* (2013.01); *A47J 31/60* (2013.01)

(58) Field of Classification Search
CPC ........................................... C02F 5/086
See application file for complete search history.

(56) References Cited

U.S. PATENT DOCUMENTS

| | | | |
|---|---|---|---|
| 3,043,772 A | 7/1962 | Liddell | |
| 3,372,110 A | 3/1968 | Fuchs | |
| 6,270,664 B1 | 8/2001 | Tsabari | |
| 7,144,513 B2 | 12/2006 | Sher | |
| 2015/0060005 A1* | 3/2015 | Hartig | B22C 1/18 164/528 |

FOREIGN PATENT DOCUMENTS

| | | |
|---|---|---|
| JP | 06-178999 | 6/1994 |
| JP | 2010-517994 | 5/2010 |
| JP | 2001-340893 | 12/2011 |

OTHER PUBLICATIONS

Extended European Search Report; European Patent Application No. 15818136.2, dated Apr. 3, 2017 (7 pages).
International Search Report and Written Opinion issued in International Application No. PCT/JP2015/003386 dated Sep. 1, 2015 (9 pages).

* cited by examiner

*Primary Examiner* — Peter F Godenschwager
(74) *Attorney, Agent, or Firm* — Hamre, Schumann, Mueller & Larson, P.C.

(57) ABSTRACT

A scale inhibitor includes a granular material composed of a particle containing a plurality of polyphosphate salts, the granular material has an asymmetric particle diameter distribution, and a particle diameter with a maximum frequency is smaller than an average particle diameter of the granular material.

5 Claims, 10 Drawing Sheets

FIG. 6
(A) 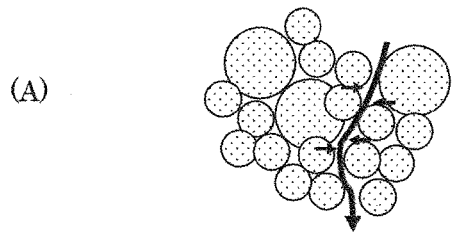
(B) 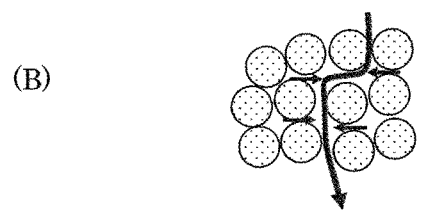
(C) 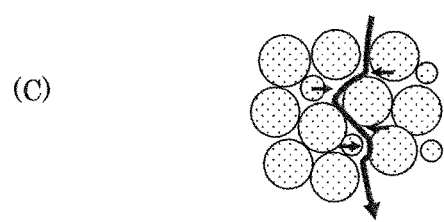

FIG. 7
(A) 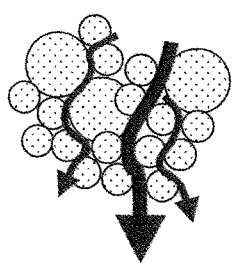
(B) 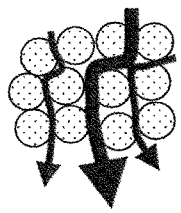
(C) 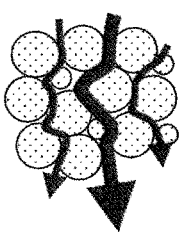

US 10,005,685 B1

SCALE INHIBITOR, SCALE-INHIBITING DEVICE USING THE SAME, AND SCALE-INHIBITING SYSTEM

TECHNICAL FIELD

The present invention relates to a scale inhibitor used to inhibit occurrence of scale in water-related devices.

BACKGROUND ART

As a scale inhibitor of this type, there is known a polyphosphoric acid-based scale inhibitor comprised of granular materials containing a plurality of polyphosphate salts (for instance, Patent Literature 1 or 2). PTL 1 or 2 has an object to improve the persistence of the effect of inhibiting occurrence of scale by further mixing a component to be coexistent with polyphosphate salts.

For instance, in the technique described in PTL 1, phosphonic acid, phosphinic acid, polycarboxylic acid and the like are mixed. In addition, in the technique described in PTL 2, alkali metal oxide, which is generally used in a polyphosphoric acid-based scale inhibitor, is mixed with alumina, silica.

CITATION LIST

Patent Literature

PTL 1: Japanese Unexamined Patent Application Publication No. 6-178999
PTL 2: Japanese Unexamined Patent Application Publication No. 2001-340893

SUMMARY OF THE INVENTION

Technical Problem

However, with the conventional scale inhibitor, the cost is increased because a component to be coexistent with polyphosphate salts is mixed to adjust the composition. Thus, there is a problem in that the conventional scale inhibitor has a manufacturing cost disadvantage relative to general polyphosphate salts.

The present invention solves the above-mentioned problem and it is an object to provide a scale inhibitor that is capable of maintaining the effect of inhibiting occurrence of scale for a long time by a simple method.

Solution to Problem

In order to solve the conventional problem, the scale inhibitor of the present invention includes a granular material composed of particles containing a plurality of polyphosphate salts, wherein the granular material has an asymmetric particle diameter distribution, and a particle diameter with a maximum frequency is smaller than an average particle diameter of the granular material.

Advantageous Effects of Invention

This can reduce wasteful consumption of scale inhibitor and can achieve a longer life. In addition, a scale-inhibiting device using this enables the reduction of the frequency and maintenance cost of maintenance such as replacement or replenishment of the scale inhibitor.

BRIEF DESCRIPTION OF DRAWINGS

FIG. 6 is a schematic illustration of a flow of water that flows through each scale inhibitor when the flow rate is low.
FIG. 7 is a schematic illustration of a flow of water that flows through each scale inhibitor when the flow rate is high.

DESCRIPTION OF EXEMPLARY EMBODIMENTS

Figure 1:
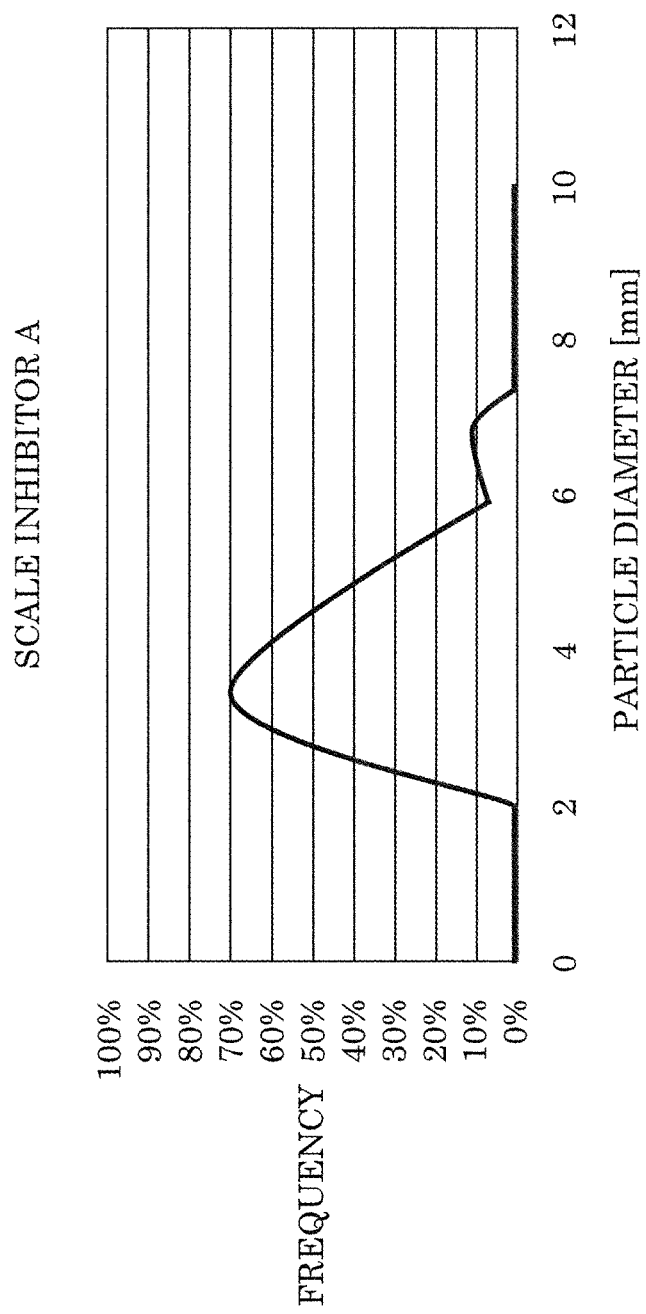
FIG. 1 is a particle diameter distribution of scale inhibitor A in Embodiment 1.

The first invention provides a scale inhibitor comprising a granular material composed of particles containing a plurality of polyphosphate salts, wherein the granular material has an asymmetric particle diameter distribution, and a particle diameter with a maximum frequency is smaller than an average particle diameter of the granular material.

Thus, when the flow rate of treat water flowing through a scale inhibitor is low, the treat water flows mainly through relatively large spaces between particles, and confluent water merging with the main flow from the surrounding is small in amount. For this reason, when the flow rate is low, the concentration, at which the scale inhibitor is dissolved in the treat water, can be reduced. Thus, a concentration necessary to inhibit occurrence of scale is ensured, and the scale inhibitor is not consumed wastefully. Consequently, the life of the scale inhibitor can be extended. In addition, it is possible to reduce the frequency and maintenance cost of maintenance such as replacement or replenishment of the scale inhibitor.

The second invention provides the scale inhibitor particularly in the first invention, wherein the granular material includes a first granular material and a second granular material having a particle diameter smaller than a particle diameter of the first granular material, and a mass of the second granular material is greater than a mass of the first granular material.

Thus, the granular material has a plurality of local maximums in the particle diameter distribution, and the particle diameter with the maximum frequency out of the local maximums is smaller than the average particle diameter. For this reason, when the flow rate is low, the concentration, at which the scale inhibitor is dissolved in the treat water, can be reduced, and the scale inhibitor is not consumed wastefully.

The third invention provides the scale inhibitor particularly in the first or second invention, wherein the polyphosphate salts include a phosphoric acid unit and an alkaline earth metal, and a molar ratio of the alkaline earth with respect to phosphorus in the phosphoric acid unit is 0.45 or less.

This increases the size of cross-linked phosphoric acid unit, and thus dispersion of the scale inhibitor from the surface is becomes slow. Therefore, when flow of the treat water is stopped, the amount of dissolved agent is decreased. Thus, unnecessary dissolution of the scale inhibitor is avoided, and a long life thereof can be achieved.

The fourth invention provides a scale-inhibiting device comprising a container filled with the scale inhibitor of any one of the first to third inventions.

Thus, a concentration necessary to inhibit occurrence of scale is ensured, and the scale inhibitor is not consumed wastefully. Consequently, the life of the device can be extended. In addition, it is possible to reduce the frequency and maintenance cost of maintenance such as replacement or replenishment of the scale inhibitor or replacement of the device itself.

The fifth invention provides a scale-inhibiting system comprising the scale-inhibiting device of the fourth invention.

Thus, the life of the device can be extended. In addition, it is possible to reduce the frequency and maintenance cost of maintenance such as replacement or replenishment of the scale inhibitor or replacement of the device itself. Consequently, in various water-related devices having the scale-inhibiting system, scale formation can be inhibited for a long time, and the life of the devices is extended and the maintenance cost such as cleaning can be reduced.

Hereinafter, embodiments of the invention will be described with reference to the drawings. It is to be noted that the present invention is not limited by the embodiments.

Embodiment 1

First, the definitions of the terms used in this embodiment will be described.

Term Definition

First, the definition of a scale inhibitor will be described. In general, the scale inhibitor is broadly classified into two types.

One type avoids scale formation by absorbing metal such as calcium, magnesium which forms sparingly soluble salts, as chelate or dissolves scale already formed, the sparingly soluble salts being potential scale such as carbonate. In this type of scale inhibitor, a high concentration of medicament corresponding to the concentration of the metal is necessary for formation of a chelate.

The other one is such that when scale composed of calcium carbonate and the like is formed, a crystal growth point of the calcium carbonate is absorbed by the scale inhibitor to inhibit or reduce the growth of calcium carbonate. In this scale inhibitor, a concentration of medicament corresponding to an active point is sufficient, thus the effect of substantially inhibiting, reducing scale formation is available by a very extremely low concentration.

The scale inhibitor in this embodiment corresponds to the latter. In particular, the scale inhibitor in this embodiment contains polyphosphate salts as described later.

In the present description, inhibition does not necessarily mean completely avoiding the formation of scale, and includes substantially inhibiting the formation of scale. In addition, inhibition naturally includes reducing the growth of formation of scale.

The scale inhibitor in this embodiment is comprised of polyphosphate salts, and phosphate ions contained in the polyphosphate salts are dissolved in treat water. In this manner, generation of scale based on the calcium, magnesium components in the treat water is substantially inhibited or reduced. The scale inhibitor contains metal ions having a positive charge, such as alkali metal in order to electrostatically cancel the negative charge of the phosphate ions.

Specifically, the scale inhibitor is polyphosphate salts containing a plurality of phosphate ions, and the phosphate ions are composed of two essential components consisting of the phosphate ions and metal ions described above.

The first essential component is formally various phosphate ions in which orthophosphoric acids are condensation-polymerized, and may contain orthophosphate ions in some cases. These phosphate ions are called a phosphoric acid unit. In other words, the phosphoric acid unit is a framework part of a phosphoric acid compound, not containing the metal ion or the hydrogen ion of the phosphoric acid compound, and indicates the ion constituted by the framework.

For instance, the phosphoric acid unit corresponding to $Na_3PO_4$ (trisodium phosphate) which is a phosphoric acid compound is the orthophosphate ion $PO_4^{3-}$. Also, a phosphoric acid unit having a degree of polymerization of 2 is pyrophoric acid ion $P_2O_7^{4-}$ in which tow molecules of orthophosphoric acid are condensed.

Furthermore, the second essential component is at least one type of alkali metal such as sodium, potassium and alkaline earth metal such as calcium, magnesium. It is to be noted that silicon, aluminum or the like may be contained as a minor component.

In general, the scale inhibitor is composed of aggregation of salt of the phosphoric acid units and the metal. For instance, the scale inhibitor is composed of aggregation of salt of the metal and phosphoric acid units in which orthophosphoric acid units and orthophosphoric acids are condensation-polymerized and which have a degree of polymerization of 2 or higher.

Also, the scale inhibitor is mainly amorphous, and preferably has less uneven distribution of components. However, there is no problem with partial presence of a crystal layer. Also, the shape of the scale inhibitor, when molded, is sphere, quasi-sphere, cube, rectangular parallelepiped, and the like, and the shape, when pulverized and formed, is a polyhedron in an indefinite shape, with a plurality of faces.

Next, the terms used in a manufacturing process of the scale inhibitor will be described.

First, a method of manufacturing the scale inhibitor will be briefly described. The scale inhibitor is manufactured by rapidly cooling a melted raw material mixture with a cooling plate to obtain an amorphous solid, further pulverizing the amorphous solid by a mill as necessary, and subsequently, classifying the pulverized solid by a "sieve".

The raw material mixture is a mixture of raw materials which are used when the scale inhibitor is manufactured, and is mainly a mixture between a compound containing phosphoric acid units corresponding to phosphates which are scale inhibiting materials, and a metal compound such as an alkali metal compound.

As a compound containing the phosphoric acid units, in addition to phosphates as the materials, phosphoric acid, condensed phosphoric acid which has not formed salt may be used.

The compound containing the phosphoric acid units is a supply source of phosphate ions that exhibit the effect of scale inhibition. As one form of phosphate, for instance, various sodium phosphates (such as a primary sodium phosphate, a dibasic sodium phosphate), various potassium phosphates (such as a potassium primary phosphate, a dipotassium hydrogenphosphate), various magnesium phosphates (such as a monomagnesium phosphate, a dimagnesium phosphate), and various calcium phosphate salt (such as a monocalcium phosphate, a dicalcium phosphate) are used. Also, as the phosphoric acid which has not formed salt in the second form, orthophosphoric acid, pyrophosphoric acid and the like are used.

The metal compound is a supply source of metal ions such as alkali metal to the scale inhibiting material. Specifically, the metal compound includes an alkali metal oxide, an alkali metal hydroxide, an alkali metal carbonate, an alkaline earth metal oxide, an alkaline earth metal hydroxide, an alkaline earth metal carbonate. It is to be noted that the various phosphates provide a supply source of phosphate ions as well as a supply source of metal ions.

In the specific manufacturing method below, there are used primary sodium phosphate as a supply source of phosphate ions and a supply source of sodium ions which are phosphoric acid units, calcium diphosphate as a supply source of calcium ions, magnesium oxide as a supply source of magnesium ions. In particular, primary sodium phosphate, calcium diphosphate, magnesium oxide are provided so that sodium, calcium, magnesium are preferably contained at a molar ratio in the ranges of 0.80 to 1.30, 0.09 to 0.27, 0.005 to 0.2, respectively, with respect to phosphorus. More preferably, those are contained in the ranges of 0.85 to 1.05, 0.10 to 0.21, 0.11 to 0.21.

When the raw material mixture is melted, a crucible is used. The precious metals, such as platinum in addition to inorganic oxides, such as alumina, magnesia, and zirconia, may be sufficient as the quality of the material of a crucible.

Alternatively, a furnace may be used. A furnace houses the crucible and melts the raw material mixture. However, when the amount of raw material mixture is large, a crucible is not used, and the raw material mixture may be directly put into a tank made of firebricks in the furnace and melted.

As a method of heating the furnace, electric heating type and fuel combustion type are provided, and one of them is used from a perspective of cost, in consideration of electric charge, fuel charge. It is to be noted that when precise temperature control is necessary, the electric heating type is preferably used.

The raw material mixture is melted, and reacted, melted material is discharged externally of a crucible or furnace to be rapidly cooled. When a crucible is used for melting, the material is discharged by ladling the material with a ladle from the crucible. Also, the melted material may be flown outside by opening a plug provided in the crucible. When the raw material mixture is directly put into a tank in the furnace without using a crucible, a structure may be adopted in which the tank is melted to be automatically flown outside. When the plug is opened or when the melted material is automatically flown outside, it is not necessary to dip the melted material by a ladle, and thus work of a worker is made simple and labor costs are reduced, which is preferable.

The cooling plate is made to come into contact with the melted material, thereby rapidly cooling and solidifying the material to from an amorphous scale inhibiting material. The melted material comes into contact with the cooling plate, thus spreads in a form of plate on the cooling plate, and is rapidly cooled and solidification advances. At this point, when the cooling plate is not plate-shaped and has a recessed portion, the scale inhibiting material can be shaped into a certain size and form by pouring the melted material into a mold.

The cooling plate needs to have a material property that protects the plate from being melted by contact with the melted material. The melting is performed normally at 1000° C. or low, thus metal such as ceramic having a melting point higher than 1000° C. is used for the cooling plate. Also, for the cooling plate, iron, stainless steel, alumina, a mixture of alumina and silica is used. The cooling plate may be cooled by liquid, gas as necessary.

The mill pulverizes the solidified amorphous scale inhibiting material into scale inhibitor particles. The mill includes a ball mill, a bead mill, a colloid mill, a conical mill, a disc mill, an edge mill, a milling mill, a hammermill, a cutter mill, a mortar mill, a pellet mill, a VSI mill, a Wiley mill, a water wheel (grinder), a roller mill, and a jet mill. An appropriate mill is used according to a particle diameter needed. It is to be noted that particles of the scale inhibitor correspond to the particles containing the polyphosphate salts in the present invention.

When the material is shaped into a certain size and form at the time of cooling as described above, the material may not be pulverized. In this case, the scale inhibiting material shaped into a certain size and form correspond to the particles containing the polyphosphate salts in the present invention.

A classifier classifies the scale inhibitor particles. The classifier includes a sieve classifier that utilizes vibration, agitation, ultrasonic waves, a wind power classifier that utilizes wind. An appropriate classifier is used according to a particle diameter needed.

(Specific Manufacturing Method)

Next, specific methods of manufacturing a scale inhibitor will be described. These methods are just examples of a method of manufacturing a scale inhibitor of the present invention, and the invention is not limited to these manufacturing methods.

A crucible was installed in a furnace, and was heated from a room temperature up to 800° C. in about two days, and was held for about 30 minutes as it was.

Next, a raw material mixture was put in the crucible. The raw material mixture is obtained by mixing primary sodium phosphate, calcium diphosphate, magnesium oxide so that the molar ratio of sodium, calcium, magnesium with respect to phosphorus is 0.89:0.18:0.11. It is to be noted that the scale inhibitor obtained from the raw material mixture may contain inevitable micro-impurities. Even when sodium, calcium, magnesium have a molar ratio in the ranges of 0.80 to 1.30, 0.09 to 0.27, 0.005 to 0.2, respectively, with respect to phosphorus, the particle diameter distribution has the same effect on the flow rate and the concentration of treat water, or the characteristics between the cumulative amount of treat water and the concentration of treat water.

After melting of the raw material mixture is checked, the melted material was ladled from the crucible in the furnace by a ladle, and was passed on a water-cooled cooling plate made of iron to be rapidly cooled. Thus obtained plate-shaped transparent solid was broken into pieces of several cm to 10 cm by the strain due to the rapid cooling.

Next, the pieces were pulverized using a cutter mill. The milling conditions were as follows: the number of revolutions of the cutter was 1000 rpm, and the diameter of inscribed circles in a screen that allow pulverized pieces to pass through was 10 mm.

The granular materials obtained by the pulverization were classified into predetermined particle diameters by a vibration sieve classifier.

Amorphous nature the obtained the scale inhibitor particles was verified by evaluating the particles after classified using X-ray diffraction. In the evaluation, measurement was made with powder.

It was verified that the composition of the obtained scale inhibitor particles had a molar ratio of P:Na:Ca:Mg=1:0.89:0.18:0.11 by evaluating the particles after classified using ICP emission spectroscopy analysis. In the evaluation, the solution obtained by dissolving the scale inhibitor particles with nitric acid was analyzed.

The classified scale inhibitor particles were mixed, and 3 types of scale inhibitors with different particle diameter distributions were adjusted. The adjustment of particle diameter distribution was made by classifying the pulverized scale inhibitor particles into each of particle size ranges, and taking a predetermined amount of particles from each particle size range in which scale inhibitor particles were collected.

Scale inhibitor A is the scale inhibitor in this embodiment, and scale inhibitor B and scale inhibitor C are comparative examples.

Scale inhibitor A combines 2 types of granular materials with different particle sizes. Specifically, scale inhibitor A is obtained by mixing granular material composed of spherical particles with an average particle diameter of 3.5 mm with granular material composed of spherical particles with an average particle diameter of 6.5 mm, and is adjusted to have an average particle diameter of 4 mm after the mixture. It is to be noted that the particle size indicates a degree of distribution state of the particles in the granular materials, and in general, the degree is expressed in terms of an average particle diameter of the particles.

FIG. 1 shows the particle diameter distribution of scale inhibitor A. As shown in FIG. 1, scale inhibitor A has an asymmetric particle diameter distribution, and the peak of the particle diameter distribution is located on a side of particle diameter smaller than the average particle diameter. It is to be noted that the "peak of the particle diameter distribution" indicates the class with the greatest frequency in a particle diameter distribution diagram.

Also, scale inhibitor A has a plurality of local maximums in the particle diameter distribution, and the particle diameter of a local maximum with the maximum frequency out of the local maximums is smaller than the average particle diameter of the granular materials. It is to be noted that "the particle diameter of a local maximum with the maximum frequency out of the local maximums" in the present invention indicates the class with the greatest frequency in a particle diameter distribution diagram.

That is, in scale inhibitor A, the particle diameter of a local maximum with the maximum frequency is 3.5 mm in the particle diameter distribution after the mixture, and is smaller than the average particle diameters of 4 mm after the mixture.

In other words, scale inhibitor A is obtained by mixture so that the mass of granular material (granular materials with a particle size of 3.5 mm) composed of spherical particles with an average particle diameter of 3.5 mm is greater than the mass of granular material (granular materials with a particle size of 6.5 mm) composed of spherical particles with an average particle diameter of 6.5 mm.

Figure 2:
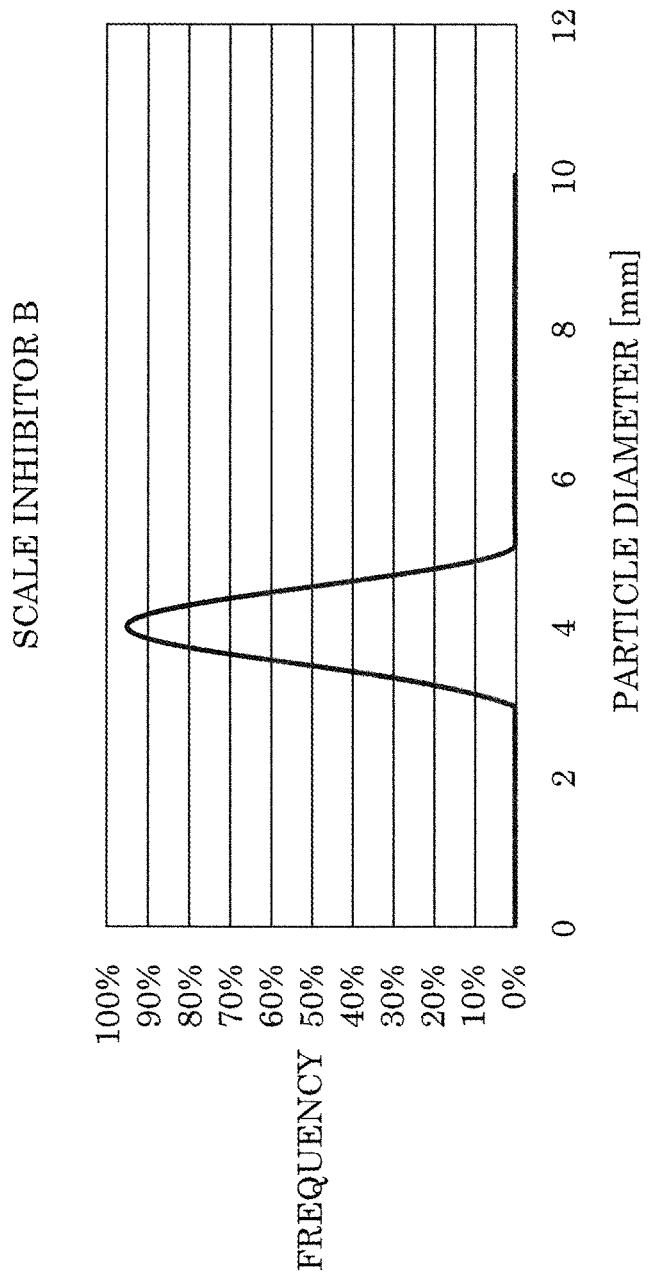
FIG. 2 is a particle diameter distribution of scale inhibitor B as a comparative example.

Scale inhibitor B is granular material composed of spherical particles with an average particle diameter of 4 mm. FIG. 2 shows the particle diameter distribution of scale inhibitor B. Scale inhibitor B is molded by pouring the raw material mixture into a mold. For this reason, the particle diameter is regular, and the particle diameter distribution is substantially symmetrical.

Scale inhibitor C combines 2 types of granular materials with different particle sizes. Specifically, scale inhibitor C is obtained by mixing granular material composed of spherical particles with an average particle diameter of 2.5 mm with granular material composed of spherical particles with an average particle diameter of 5 mm, and is adjusted to have an average particle diameter of 4 mm after the mixture.

Figure 3:
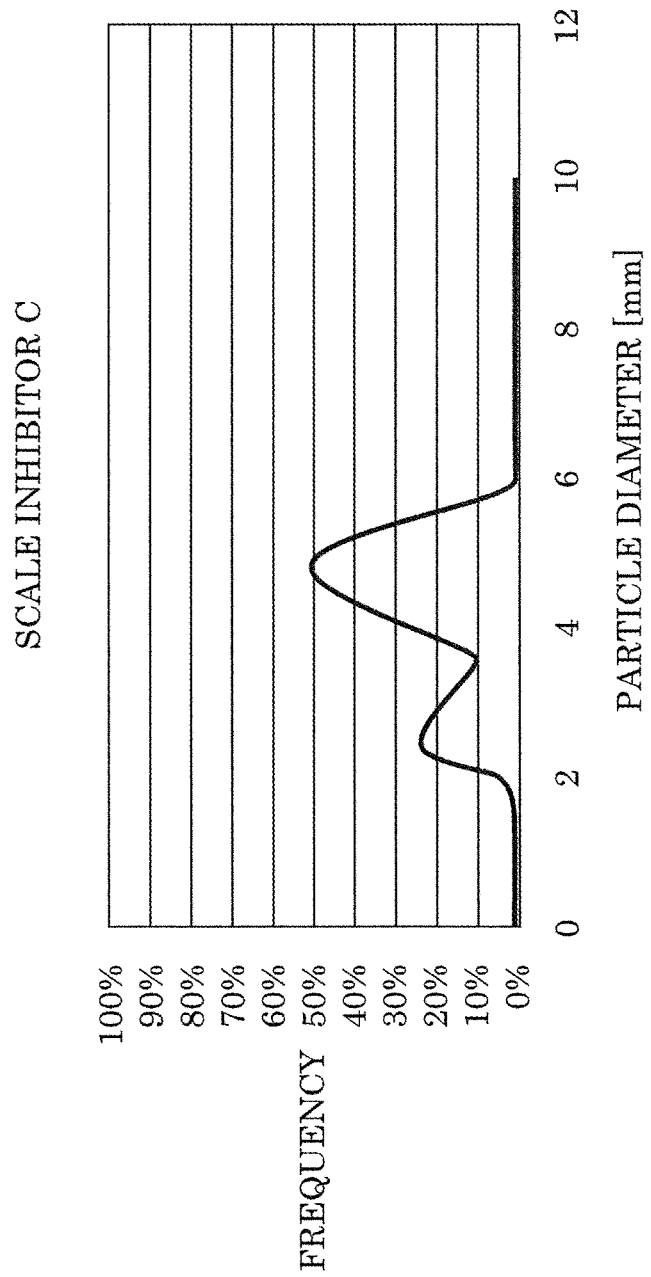
FIG. 3 is a particle diameter distribution of scale inhibitor C as a comparative example.

FIG. 3 shows the particle diameter distribution of scale inhibitor C. As shown in FIG. 3, scale inhibitor C has an asymmetric particle diameter distribution, and the peak of the particle diameter distribution is located on a side of particle diameter larger than the average particle diameter. That is, in scale inhibitor C, the particle diameter of a local maximum with the maximum frequency is 5 mm in the particle diameter distribution after the mixture, and is larger than the average particle diameters of 4 mm after the mixture.

(Evaluation Method)

As described above, 3 types of scale inhibitor with different particle diameter distributions were adjusted, and the particle diameter distribution, the bulk density, the dependence of the concentration of treat water on the treat water flow rate, the dependence of the concentration of treat water on the cumulative amount of treat water of each type was evaluated.

Measurement of particle diameter distribution was made by using image analysis type particle diameter distribution measurement software based on captured images of each scale inhibitor. In the measurement, for each particle in the images, numerical data such as a major axis, a minor axis, a surrounding length, a projected area, a coefficient of degree of circularity, an aspect ratio are obtained. In this embodiment, the diameter of a particle is given by Heywood diameter which converts to the diameter of a circle corresponding to the projected area of the particle. Also, the average particle diameter is given by the average of Heywood diameter by number.

Also, an image to be used for analysis may be directly obtained from an optical microscope, an electron microscope, a digital camera.

Specific steps of measuring a particle diameter distribution will be described. First the entire amount of the scale inhibitor is taken, and an image of particles is captured so that the particles do not overlap. Particle size analysis is conducted on the image. By an analysis result, the particle diameter distribution diagrams as FIG. 1 to FIG. 3 are obtained. A particle diameter distribution diagram is a conceptual diagram that indicates what is called a frequency distribution of particle diameter, and the horizontal axis indicates particle diameter set for each class, and the vertical axis indicates frequency. Here, the width of each class in FIG. 1 to FIG. 3 is set 0.1 mm or less.

The bulk density of each scale inhibitor was measured by a poured bulk density measuring instrument. The bulk density was 1.358 g/cm$^3$ for scale inhibitor A, 1.300 g/cm$^3$ for scale inhibitor B, 1.318 g/cm$^3$ for scale inhibitor C.

Also, the true density of scale inhibitor was measured by a gas phase substitution method (fixed volume expansion method). The filling factor of scale inhibitor was calculated from the ratio of the bulk density to the true density. The filling factor was 0.522 for scale inhibitor A, 0.500 for scale inhibitor B, 0.507 for scale inhibitor C. Scale inhibitor A has the highest filling factor, and scale inhibitor B has the lowest filling factor.

Figure 4:
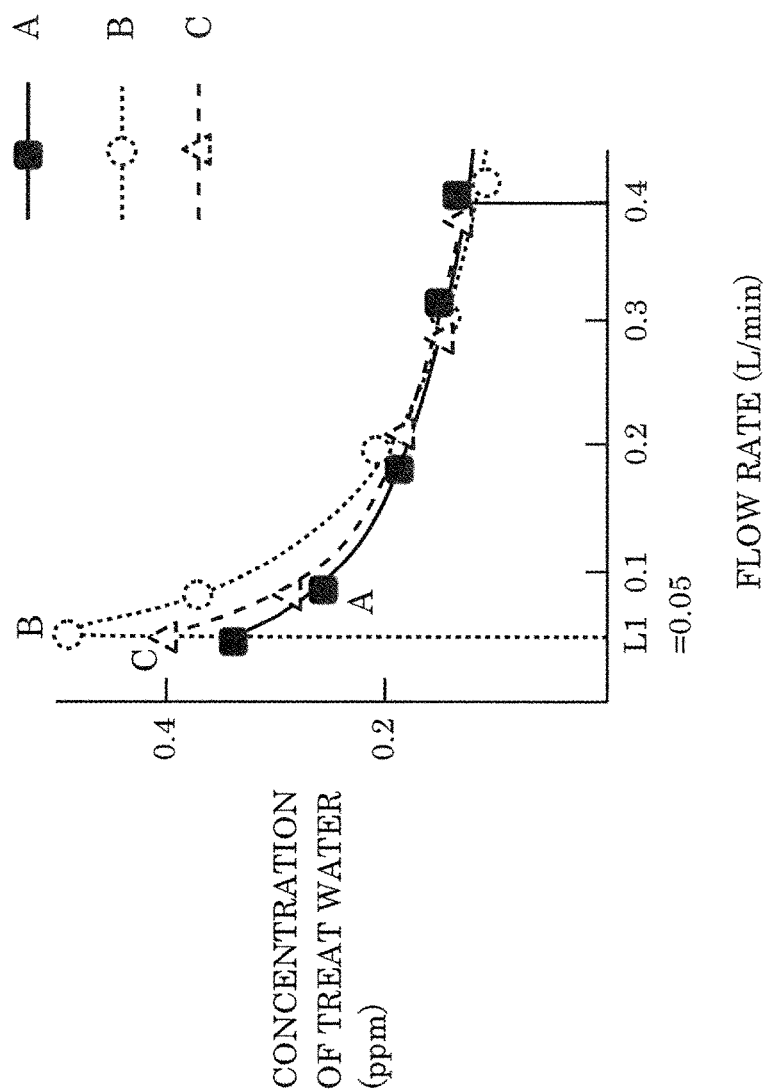
FIG. 4 is a characteristic graph showing the concentration of treat water with respect to the flow rate of each scale inhibitor.

Next, the characteristics of the concentration of treat water in relation to the flow rate of scale inhibitor will be described. FIG. 4 is a characteristic graph showing the concentration of treat water in relation to the flow rate of each scale inhibitor. Hereinafter, a method of measuring the characteristic will be described.

Figure 5:
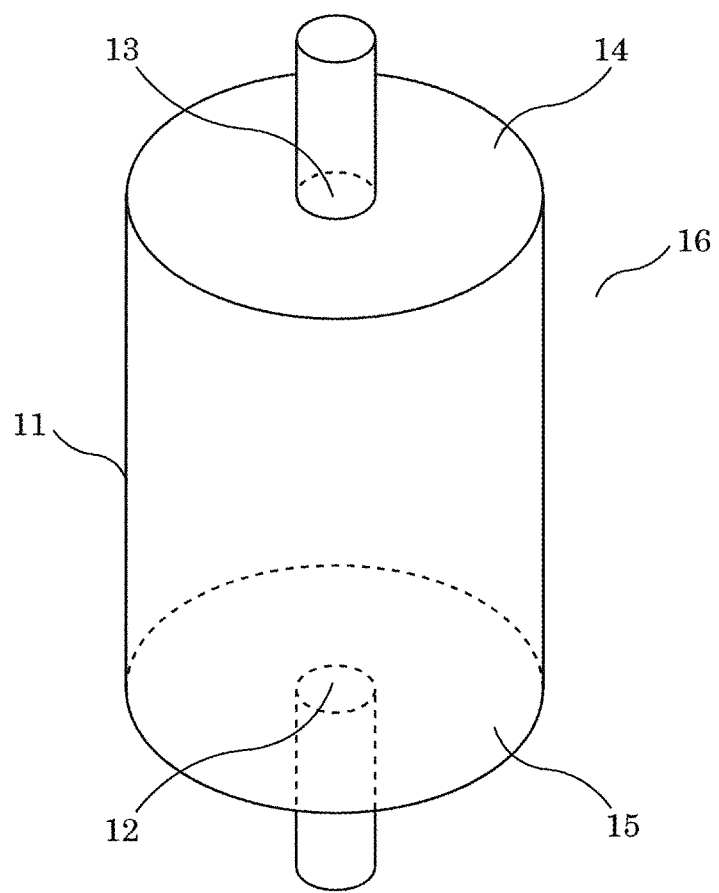
FIG. 5 is a perspective view of a cartridge for scale inhibition in Embodiment 1.

First, scale inhibitor was filled in a container of cylindrical body 11 made of acrylic as shown in FIG. 5, both ends of cylindrical body 11 were sealed by flat plates 14, 15 having holes 12, 13 for water flow, and cartridge 16 for scale inhibition was formed. When the scale inhibitor was filled in cylindrical body 11, it was visually verified that there was no variation in the size, amount of the scale inhibitor in cylindrical body 11. The filling volume of the scale inhibitor was set to 60 g. It is to be noted that although a transparent material, acrylic was used as the material of cylindrical body 11 so that the inside can be checked, as long as the material has the strength against a water pressure to be used and water resistance are, other resin or metal may be naturally used.

No particular restriction is made on the shape, configuration of cartridge 16 for scale inhibition, as long as the structure is provided that allows the scale inhibitor to be filled in and water to pass through.

Evaluation was conducted using cartridges 16 for scale inhibition which are filled with scale inhibitor A, scale inhibitor B, and scale inhibitor C, respectively.

Treat water was poured through hole 12 at one end of cartridge 16 for scale inhibition, and elemental phosphorus component of treat water coming out through hole 13 at the other end was measured using an ICP emission spectroscopy analyzer.

The treat water was standard high hard water (total hardness of 350 ppm) specified by standard 60734 of IEC (International Electrotechnical Commission). It is to be noted that the treat water may be standard hard water (total hardness of 250 ppm) or standard medium hard water (total hardness of 150 ppm), or other water quality may be selected. No matter which water is used, there is not much difference in the results.

Water flow through cartridge 16 for scale inhibition was produced with 5 levels of flow rate using treat water adjusted to a water temperature of 20° C. The lowest flow rate (L1) is 0.05 L/min. After allowing water to flow for 30 minutes with each level of flow rate, the treat water coming out through hole 13 of cartridge 16 for scale inhibition was sampled. The sampled treat water was then analyzed by the ICP emission spectroscopy analyzer.

It is to be noted that the water temperature of the treat water is not limited to 20° C. and may be any temperature assumed in actual use conditions.

FIG. 4 shows a result. The concentration of treat water of the vertical axis is the concentration of elemental phosphorus. In FIG. 4, black squares indicate a result of scale inhibitor A, white circles indicate a result of scale inhibitor B, and white triangles indicate a result of scale inhibitor C. As in the characteristic diagram shown in FIG. 4, when the flow rate of water flow through cartridge 16 for scale inhibition is high, any scale inhibitor out of scale inhibitors A to C has substantially the same concentration of treat water.

On the other hand, when the flow rate of water flow through cartridge 16 for scale inhibition is low, scale inhibitor A with the highest filling factor has the lowest treat concentration, and scale inhibitor B with the lowest filling factor has the highest treat concentration.

The relationship between the filling factor of scale inhibitor and the concentration of treat water will be described using the schematic illustration of FIG. 6. (A) to (C) in FIG. 6 are schematic illustrations of scale inhibitors A to C, respectively.

When the flow rate of water flow through cartridge 16 for scale inhibition is low, almost all treat water flows as indicated by arrows extending in an approximately up-and-down direction in FIG. 6. That is, a main flow, which flows through relatively large spaces out of spaces formed between particles, is formed. As indicated by arrows extending in an approximately right-and-left direction in FIG. 6, a small amount of treat water (confluent water) joins to the main flow from the surrounding. The main flow and the confluent water are then discharged through hole 13 on the lower side of cartridge 16 for scale inhibition.

In the case where the filling factor is high (see (A) in FIG. 6) as with scale inhibitor A, the ratio of the confluent water with respect to the main flow is reduced, compared with the case where the filling factor is low (see (B), (C) in FIG. 6) as with scale inhibitor B and scale inhibitor C. For this reason, in the case where the filling factor is high as with scale inhibitor A, the amount of scale inhibitor dissolved in the confluent water is reduced. Consequently, as shown in FIG. 4, in an area where the flow rate is low, the concentration of the treat water discharged through hole 13 is reduced.

On the other hand, when the flow rate of water flow through cartridge 16 for scale inhibition is high, the treat water flows as indicated by arrows extending in an approximately up-and-down direction in FIG. 7. That is, the treat water flows through entire spaces formed between particles. For this reason, the concentration of the treat water discharged through hole 13 is proportional to the surface area of scale inhibitor. Since scale inhibitors A to C have the same average particle diameter, in an area where the flow rate is high, the concentrations of treat water are substantially the same.

Figure 8:
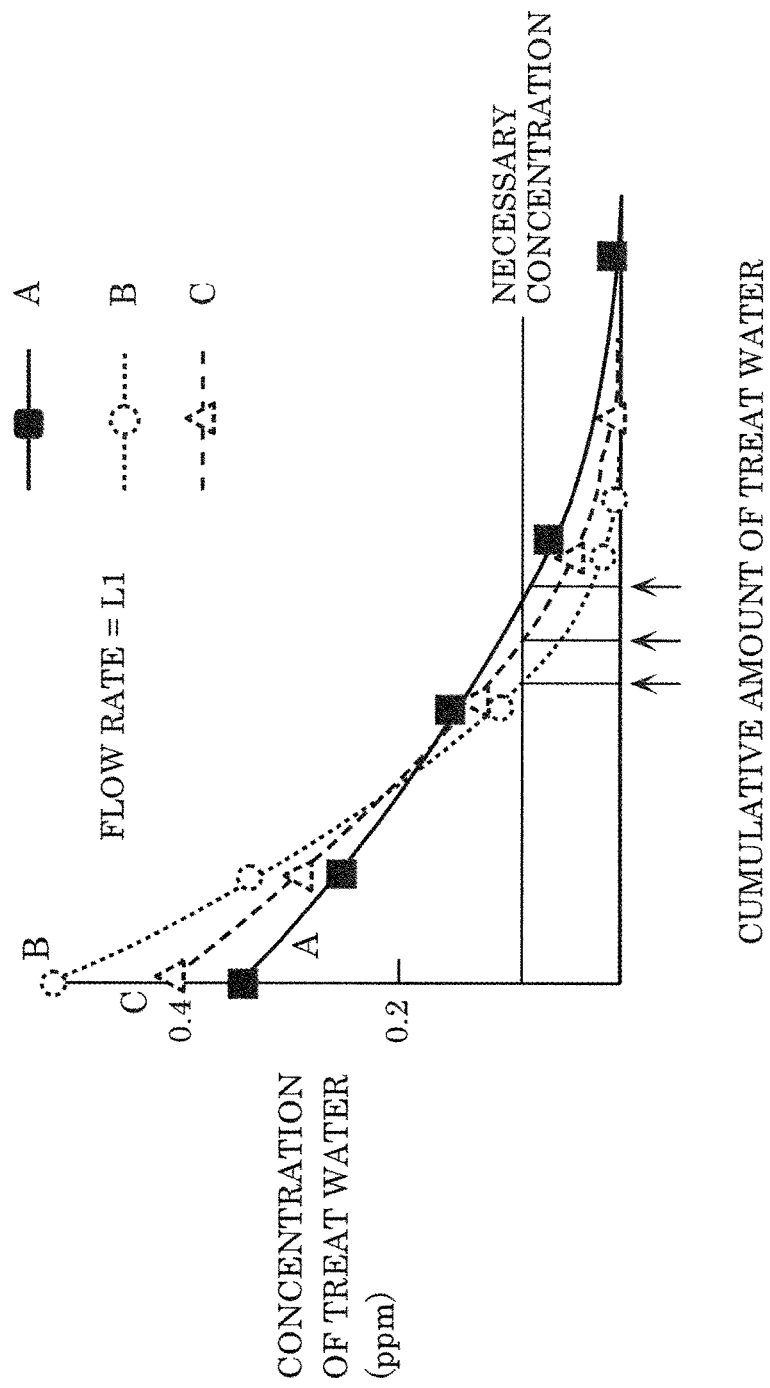
FIG. 8 is a characteristic graph showing a concentration of treat water in relation to a cumulative amount of treat water of each scale inhibitor.

Next, the characteristics of the concentration of treat water in relation to a cumulative amount of treat water will be described. The cumulative amount of treat water is an integral amount of treat water from the start of water flow of treat water until elapse of a predetermined time. FIG. 8 is a characteristic graph showing the concentration of treat water in relation to the cumulative amount of treat water of each scale inhibitor. In FIG. 8, measurement was made using cartridge 16 for scale inhibition which was used in the measurement to obtain the result of FIG. 4.

Also, analysis of the water quality and temperature of treat water, elemental phosphorus component of treat water was conducted in the same measurement conditions, measurement method as in the measurement to obtain the result of FIG. 4.

The flow rate was set to flow rate L1 which is the lowest flow rate in the measurement to obtain the result of FIG. 4. The treat water was flown through scale inhibiting cartridge 16 continuously with flow rate L1, and during the water flow, the treat water coming out through hole 13 of cartridge 16 for scale inhibition was sampled for every predetermined period, and the elemental phosphorus component was analyzed.

FIG. 8 shows a result. In FIG. 8, black squares indicate a result of scale inhibitor A, white circles indicate a result of scale inhibitor B, and white triangles indicate a result of scale inhibitor C.

As shown in FIG. 8, for each scale inhibitor A to C, the concentration of treat water gradually decreases as the cumulative amount of treat water is increased. This is because, as the cumulative amount of treat water is increased, the remaining amount of scale inhibitor to be dissolved is reduced.

When the concentration of treat water becomes a necessary concentration or lower, cartridge 16 for scale inhibition reaches its life. Cartridge 16 for scale inhibition, when reaching the life, needs to be replaced with new cartridge 16 for scale inhibition. Alternatively, cartridge 16 for scale inhibition in use needs to be replenished with new scale inhibitor.

Here, the necessary concentration is a concentration necessary to ensure a predetermined effect of inhibiting occurrence of scale, and is set as needed according to the total hardness of treat water, provided equipment, the operating conditions of a device.

The cumulative amount of treat water, which corresponds to the life of each scale inhibitor, is indicated by arrows in FIG. 8. In FIG. 8, when scale inhibitors A to C are compared, the larger the filling factor is, the longer the life is, and scale inhibitor A has the longest life.

FIG. 8 shows a result with low flow rate L1. Thus, scale inhibitor A with the highest filling factor has the lowest concentration of treat water. Therefore, scale inhibitor A has the lowest rate of consumption, and the lowest reduction rate of concentration of treat water. Consequently, a time, at which a necessary concentration or lower is reached with scale inhibitor A is later than with scale inhibitors B and C, thereby achieving the longest life.

Also, in a scale-inhibiting device with any container filled with scale inhibitor A, when the flow rate of treat water flowing through the scale inhibitor, in other words, the flow rate of treat water flowing out from the scale-inhibiting device is low, the concentration of treat water can be low. Thus, the scale inhibitor is not consumed wastefully. Consequently, it is possible to achieve a longer life of the scale inhibitor and the scale-inhibiting device.

According to the result of FIG. 4, with scale inhibitor A or a scale-inhibiting device using scale inhibitor A, in an area with approximately 0.1 L/min or less, the effect reducing the concentration of treat water is achieved. In addition, according to the result of FIG. 8, the effect of increasing life is achieved with 0.05 L/min. Like this, although the effect of scale inhibitor A or a scale-inhibiting device using scale inhibitor A is noticeable in an area where the flow rate is low, the flow rate area is not limited to the aforementioned low flow rate area of 0.05 to 0.1 L/min.

For instance, the flow rate area in which the effect of increasing life is achieved depends on the solubility of a scale inhibitor to be used. Therefore, when the solubility of a scale inhibitor is high, the flow rate area in which the effect is achievable extends to a higher flow rate area. This is probably because although the components of a scale inhibitor dissolved in the treat water are present in the spaces between the particles of the scale inhibitor, with a higher solubility and a higher concentration of the dissolved components, the dissolved components are not likely to flow out unless with a higher flow rate.

It is to be noted that the scale inhibitor in this embodiment is granular material and uses the particles obtained by pulverizing pieces of polyphosphate salts. In addition, plate-shaped pieces, irregular plate-shaped pieces with a certain thickness obtained by pulverizing a plate, pieces shaped in a quasi-cube, quasi-rectangular parallelepiped are also included in the granular material comprised in the scale inhibitor of the present invention. That is, as long as the particle diameter distribution for all particles is asymmetric, and the peak of the particle diameter distribution is located on a side of particle diameter smaller than the average particle diameter, the granular material is applicable to the scale inhibitor of the present invention. Alternatively, as long as the granular material has a plurality of local maximums in the particle diameter distribution for all particles, and the particle diameter of a local maximum with the maximum frequency out of the local maximums is smaller than the average particle diameter, the granular material is applicable to the scale inhibitor of the present invention.

It is to be noted that in the composition of elements comprised of the scale inhibitor particles, when the molar ratio of alkaline earth metal with respect to phosphorus is enhanced, the aforementioned effect is also increased.

This is because of the following reasons. An alkaline earth metal forms cross-links between two phosphoric acid units. When a proportion of alkaline earth metal is high, the cross-links increase and extremely large cross-linked phosphoric acid units are formed.

At the time of dissolution, alkaline earth metal parts are hardly dissociated, and alkaline metal parts are dissociated. Due to dissociation of alkaline metal parts, the huge cross-linked phosphoric acid units desorb from the surface of the scale inhibitor particles. At this point, since their size is large, dispersion from the surface of the scale inhibitor particles is very slow. Thus, when the flow rate of treat water is low as in FIG. 6, the amount of dissolved components which disperse from the surrounding and flow into the main flow is reduced. Consequently, the concentration of treat water is significantly reduced.

Thus, when the molar ratio of alkaline earth metal with respect to phosphorus is enhanced, the rate of consumption of the scale inhibitor is reduced, and the reduction rate of the concentration of treat water is also decreased. Consequently, the life of the scale inhibitor is extended. Because of the aforementioned reasons, it is desirable that the proportion (molar ratio) of alkaline earth metal with respect to phosphorus be 0.22 or higher.

A preferable specific composition is that the proportion (molar ratio) of alkaline earth metal with respect to phosphorus is in the range of 0.22 to 0.45. Also, the proportion (molar ratio) of alkaline metal with respect to phosphorus is in the range of 0.8 to 1.2.

When the proportion (molar ratio) of alkaline earth metal with respect to phosphorus exceeds 0.45, it may be difficult to obtain a uniform glass. In this case, in non-uniform portions, that is, in portions with less alkaline earth metal, the degree of cross-linking is reduced, and small-size phosphoric acid units are likely to be formed. Therefore, it is desirable that the proportion (molar ratio) of alkaline earth metal with respect to phosphorus be 0.45 or lower. With this, particularly when water flow of the treat water is stopped, the amount the scale inhibitor dissolved in the treat water can be reduced. Consequently, the scale inhibitor is not consumed wastefully.

In the composition of elements comprised of the scale inhibitor particles, when the proportion of alkaline metal is reduced, the proportion of alkaline earth metal is relatively increased. As described above, it is not desirable that the proportion of alkaline earth metal is too high. Thus, it is desirable that the proportion (molar ratio) of alkaline metal with respect to phosphorus be 0.8 or higher.

Also, when the proportion of alkaline metal is increased, the proportion of alkaline earth metal is relatively decreased. When the proportion of alkaline earth metal is reduced, the number of portions where an alkaline metal is dissociated increases in cross-linked phosphoric acid units. This makes it much easier for the scale inhibitor to be dissolved. Excessive dissolution in water is not preferable because the scale inhibitor is consumed wastefully. Thus, it is desirable that the proportion (molar ratio) of alkaline metal with respect to phosphorus be 1.2 or lower.

Furthermore, it is more preferable that the proportion (molar ratio) of alkaline earth metal with respect to phosphorus be in the range of 0.33 to 0.42, and the proportion of alkaline metal with respect to phosphorus be in the range of 0.8 to 1.05. This is because increase in alkaline earth metal causes an increase in cross-links as well as a decrease in alkaline metal, and thus the degree of polymerization in phosphoric acid units increases, and the size of cross-linked phosphoric acid units is further increased.

Also, the upper limit of the proportion (molar ratio) of alkaline earth metal is set to 0.42, thus a yield of uniform glass can be increased.

Also, the proportion (molar ratio) of alkaline metal with respect to phosphorus is set to the range of 0.8 to 1.05, and excessive dissolution is thereby avoided and the proportion of alkaline earth metal is relatively increased. Thus, when water flow of the treat water is stopped, unnecessary dissolution of the scale inhibitor can be avoided.

It is to be noted that as the alkaline earth metal, calcium, magnesium are preferably used in view of availability, safety. As the alkaline metal, potassium, and particularly sodium are preferably used in view of availability.

Embodiment 2

Next, a scale-inhibiting system including a scale-inhibiting device will be described.

The scale-inhibiting system provides various equipment and devices that include the scale-inhibiting device described in Embodiment 1 and inhibits formation of scale. Specifically, the scale-inhibiting system corresponds to various water-related devices, use of which is interfered with by formation of scale, and more specifically, corresponds to a water heater, a washing machine, a toilet, a boiler, a coffee maker, a dishwasher.

Figure 9:
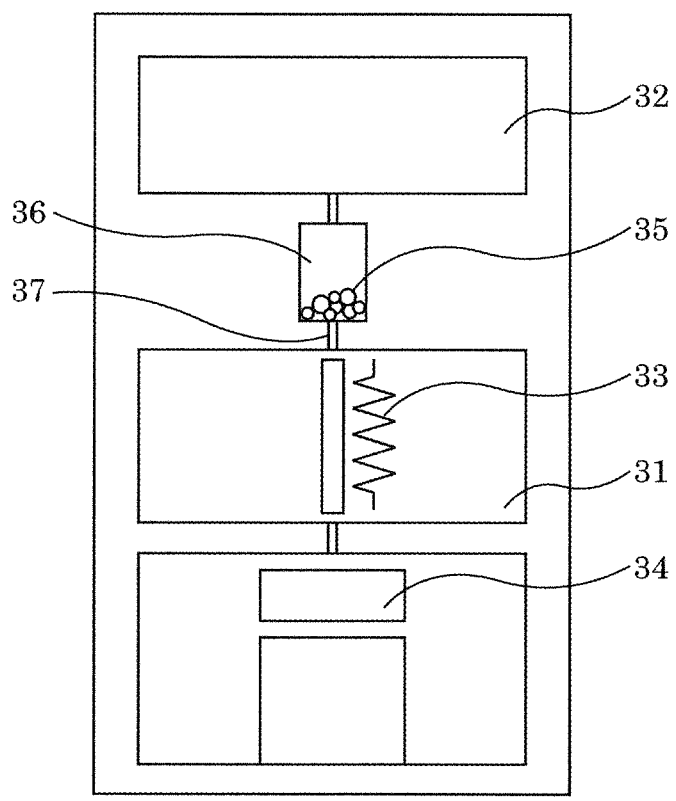
FIG. 9 is a schematic configuration diagram of a coffee maker as a scale-inhibiting system in Embodiment 2.

The scale-inhibiting system in this embodiment is a coffee maker. The schematic configuration of the coffee maker will be described using FIG. 9. The coffee maker includes water supply unit 32 that supplies water to kettle unit 31, kettle unit 31 that includes heater 33 and supplies hot water to coffee extractor 34, and coffee extractor 34 that can contain coffee bean powder or a capsule internally including coffee bean powder. Scale inhibiting device 36 having built-in scale inhibitor 35 described in Embodiment 1 is provided in water supply path 37 that connects water supply unit 32 and kettle unit 31.

When water is supplied to kettle unit 31 from water supply unit 32, water passes through scale-inhibiting device 36 and scale inhibitor 35 in scale-inhibiting device 36 is thereby dissolved in the water. The water, in which scale inhibitor 35 is dissolved, is supplied to kettle unit 31. With this, even when heater 33 heats water in kettle unit 31, calcium carbonate and the like is not precipitated. That is, the effect of inhibiting formation of scale is obtained.

The coffee maker in this embodiment is for espresso, and the flow rate of water that flows through scale-inhibiting device 36 is approximately 0.07 L/min.

In this embodiment, as scale inhibitor 35, scale inhibitor A described in Embodiment 1 is used. Also, scale inhibitor B is used as a comparative example.

Thus, similarly to the result of FIG. 4, in the case where scale inhibitor A is used, compared with the case where scale inhibitor B is used, the initial concentration is reduced. Also, similarly to the result of FIG. 8, in the case where scale inhibitor A is used, compared with the case where scale inhibitor B is used, the rate of decrease in the concentration of elemental phosphorus of scale inhibitor is reduced, and the life, in which a necessary concentration is ensured, has increased.

Consequently, the time (life) since scale is formed in kettle unit 31 until the coffee maker becomes unusable is also increased.

Embodiment 3

Figure 10:
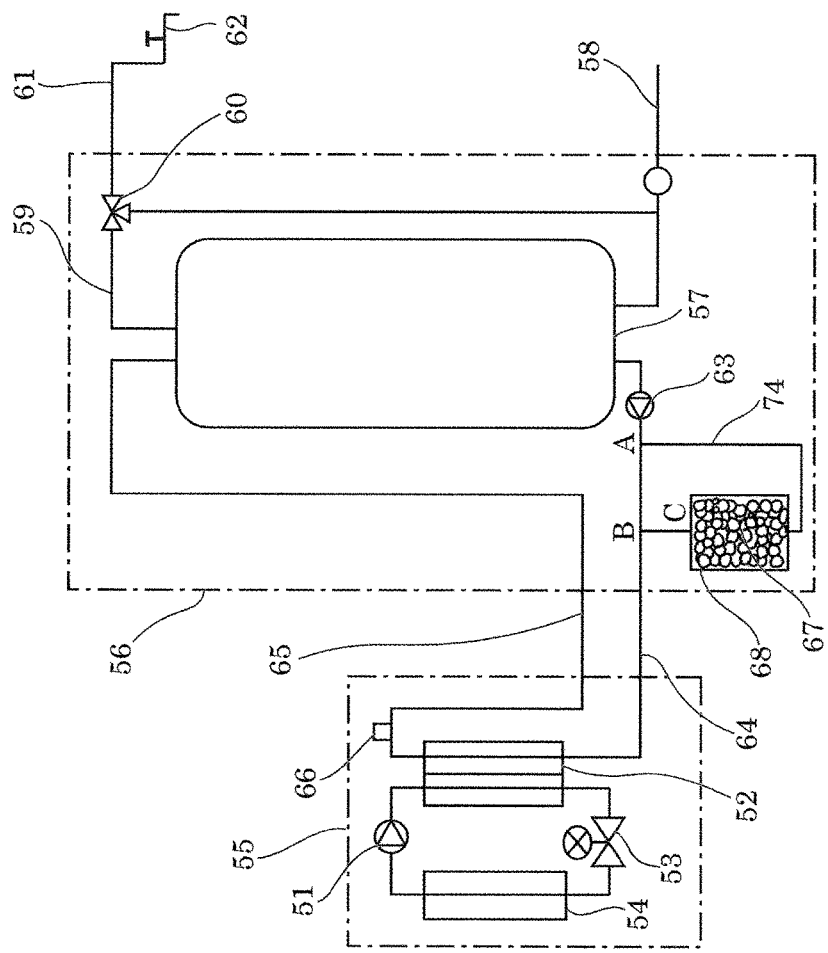
FIG. 10 is a schematic configuration diagram of a water heater as a scale-inhibiting system in Embodiment 3.

A scale-inhibiting system in this embodiment is a water heater. The schematic configuration of the water heater will be described using FIG. 10.

The water heater includes heat pump unit 55 that is a heating means that boils water, and hot water storage unit 56 provided with hot water storage tub 57 that stores hot water boiled by heat pump unit 55.

Heat pump unit 55 includes a refrigeration cycle circuit. The refrigeration cycle circuit is formed by pipe-connecting compressor 51, hot water supply heat exchanger 52, decompressor 53, evaporator 54.

The water heater includes a water circuit. The water circuit includes inlet water pipe line 64 that connects a lower portion of hot water storage tub 57 and hot water supply heat exchanger 52, and outlet hot-water pipe line 65 that connects hot water supply heat exchanger 52 and an upper portion of hot water storage tub 57. Outlet hot water pipe line 65 is provided with temperature detector 66 that detects the temperature of hot water heated by hot water supply heat exchanger 52.

Hot water storage unit 56 includes water supply pipe 58 for supplying water to a lower portion of hot water storage tub 57, and hot-water supply pipe line 59 for drawing hot water from an upper portion of hot water storing tub 57, and hot-water supply mixing valve 60 that mixes hot water flowing through hot water supply pipe line 59 with water from water supply pipe 58. Hot water is mixed with water by hot water supply mixing valve 60, and hot water at a predetermined temperature is thereby delivered from faucet 62 via hot water supply line 61.

Hot water storage unit 56 includes circulation pump 63 provided in inlet water pipe line 64, and scale-inhibiting device 68.

Scale inhibiting device 68 includes cartridge 16 for scale inhibition which is filled with scale inhibitor 67. Scale inhibiting device 68 is provided in bypass circuit 74 that bypasses part of inlet water pipe line 64. Bypass circuit 74 branches from inlet water pipe line 64 at connection portion 74A, and merges with inlet water pipe line 64 at connection portion 74B. That is, scale-inhibiting device 68 is provided in parallel with inlet water pipe line 64.

The operation, effect of the water heater configured as such will be described.

When hot water is stored in hot water storage tub 57, water is heated by heat pump unit 55. High temperature and high pressure cooling medium discharged from compressor 51 flows into hot water supply heat exchanger 52, exchanges heat with water sent from a lower portion of hot water storage tub 57, is decompressed by decompressor 53, absorbs heat from evaporator 54, then is gasified and returns to compressor 51.

The water at a lower portion of hot water storage tub 57 is sent to hot water supply heat exchanger 52 by circulation pump 63. Part of water sent from a lower portion of hot water storage tub 57 is shunted to bypass circuit 74 including scale-inhibiting device 68 at connection portion 74A. The remaining water flows to inlet water pipe line 64 which does not include scale-inhibiting device 68.

The water flowing through bypass circuit 74 flows into scale-inhibiting device 68, and dissolves scale inhibitor 67. Subsequently, the water merges with the water that has flown through inlet water pipe line 64, at connection portion 74B. The merged water flows into hot water supply heat exchanger 52, and is heated by the cooling medium. At this point, calcium carbonate and the like is not precipitated in hot water supply heat exchanger 52 by scale inhibitor 67 contained in water. That is, the effect of inhibiting occurrence of scale is obtained. Subsequently, the hot water heated by hot water supply heat exchanger 52 flows through outlet hot water pipe line 65, and is stored in an upper portion of hot water storage tub 57.

In this embodiment, as scale inhibitor 67, scale inhibitor A described in Embodiment 1 is used. Also, scale inhibitor B is used as a comparative example. Also, the water which flows through scale-inhibiting device 68 is approximately 6% of the water which flows into inlet water pipe line 64 before shunted, and the average flow rate of water was approximately 0.05 L/min.

Thus, similarly to the result of FIG. 4, in the case where scale inhibitor A is used, compared with the case where scale inhibitor B is used, the initial concentration is reduced. Also, similarly to the result of FIG. 8, in the case where scale inhibitor A is used, compared with the case where scale inhibitor B is used, and the life, in which a necessary concentration is ensured, has increased.

It is to be noted that water is shunted to flow to scale-inhibiting device 68, thereby making it easy to adjust the flow rate of water flowing through the scale-inhibiting device. Thus, it is easy to adjust to an appropriate concentration of the scale inhibitor. Furthermore, by shunting the flow, the flow rate in scale-inhibiting device 68 is reduced, and the characteristics of the scale inhibitor of the present invention become noticeable, thereby making it possible to avoid wasteful dissolution and to effectively consume the scale inhibitor. It is to be noted that the configuration of such shunting is applicable not only to a water heater, but also to various water-related devices which are other scale-inhibiting systems.

In the above, the scale inhibitor in the present embodiment is granular materials, the particle diameter distribution is asymmetric, and the peak of the particle diameter distribution is adjusted to be located on a side of smaller particle diameter. Alternatively, the granular materials are adjusted to have a plurality of local maximums in the particle diameter distribution, and the particle diameter of a local maximum with the maximum frequency out of the local maximums is smaller than the average particle diameter.

Also, using a scale-inhibiting device with any container filled with the scale inhibitor in the present embodiment enables the life of the device to be extended, particularly when the flow rate of treat water flowing through the scale inhibitor is low.

Thus, it is possible to reduce the frequency and maintenance cost of maintenance such as replacement or replenishment of the scale inhibitor or replacement of the entire scale-inhibiting device. In various water-related devices as the scale-inhibiting systems to which a scale-inhibiting device is applied, inhibiting formation of scale for a long time enables the life of the devices to be extended and the frequency and cost of maintenance such as cleaning to be reduced.

INDUSTRIAL APPLICABILITY

As described above, the scale inhibitor of the present invention is not likely to be consumed wastefully, and thus a concentration necessary for scale inhibition in water-related devices can be ensured for a long time. Consequently, the life of the scale inhibitor can be extended, and it is possible to reduce the frequency and maintenance cost of maintenance such as replacement or replenishment of the scale inhibitor.

It is to be noted that the scale inhibitor of the present invention achieves the effect of inhibiting occurrence of scale in water-related devices regardless of whether the devices are for home use or industrial use. For instance, for home use, a water heater, a washing machine, a toilet and others may be included, and for industrial use, a boiler, a coffee maker for stores, a dishwasher and others may be included. Also, the invention is applicable to other water-related devices.

In particular, one of the characteristics of the scale inhibitor of the present invention is that a concentration change in relation to the flow rate of treat water is small. Thus, it is effective to dispose the scale inhibitor at a section through which treat water flows, and when the present invention is applied to a water-related device through which treat water flows, the effect is exhibited preferably.

The invention claimed is:

1. A scale inhibitor comprising a granular material composed of particles containing a plurality of polyphosphate salts, wherein the granular material has an asymmetric particle diameter distribution, and a particle diameter with a maximum frequency is smaller than an average particle diameter of the granular material.

2. The scale inhibitor according to claim 1,
wherein the granular material includes a first granular material and a second granular material having a particle diameter smaller than a particle diameter of the first granular material, and a mass of the second granular material is greater than a mass of the first granular material.

3. The scale inhibitor according to claim 1 or 2,
wherein the polyphosphate salts include a phosphoric acid unit and an alkaline earth metal, and a molar ratio of the alkaline earth with respect to phosphorus in the phosphoric acid unit is 0.45 or less.

4. A scale-inhibiting device comprising a container filled with the scale inhibitor according to any one of claims 1 to 3.

5. A scale-inhibiting system comprising the scale-inhibiting device according to claim 4.

* * * * *